UNITED STATES PATENT OFFICE.

JOSEPH C. HAMES, OF GOLDFIELD, NEVADA.

ASSAYING COMPOSITION.

938,849.  Specification of Letters Patent.  Patented Nov. 2, 1909.

No Drawing.  Application filed April 21, 1909.  Serial No. 491,315.

*To all whom it may concern:*

Be it known that I, JOSEPH C. HAMES, a citizen of the United States, residing at Goldfield, in the county of Esmeralda and State of Nevada, have invented new and useful Improvements in Assaying Composition, of which the following is a specification.

My present invention pertains to assaying, and consists in efficient compositions for use in the same.

In assaying for gold I take a definite quantity, say one-half assay ton, of pulp, and add to the same 17 parts of a composition consisting of the following ingredients, combined in substantially the proportions stated, viz:

| | | |
|---|---|---|
| Gum camphor | 1 | part. |
| Iodin crystals | 20.736 | parts. |
| Patassium iodid | 41.471 | parts. |
| Water | 310. | parts. |

I find from experiment that the best results are obtained by adding to the pulp 3 parts of the camphor, iodin and potassium iodid in a dry state, and 14 parts of water, in the order named, and then suitably stirring or agitating the mass.

To the solution from the assay described in the foregoing I add 3/4 dram of sodium amalgam, this latter to precipitate gold, after which the metallic gold may be recovered in any of the well known ways extant.

The generic assaying process and the specific process of assaying for gold, hereinbefore described, constitute the subject matter of my Letters-Patent No. 913,129.

In assaying for silver I practice the process described up to and including the addition of the gum camphor, iodin crystals and potassium iodid and the water to the pulp. I then add to the whole sodium cyanid corresponding in quantity to the pulp. Then I take the solution from said assay, and precipitate the silver on zinc shavings or with zinc dust. With this done, the mass of zinc shavings or zinc dust is dissolved in nitric acid.

As an indicator solution I use one part of a suitable starch (preferably arrow-root starch) to one-hundred parts of water. The starch and water are mixed cold, and the solution is let come to a boil and is boiled approximately two minutes, and when cool is ready for use.

Experience has demonstrated that it is best to add one part of the starch solution to about ten parts of the silver nitrate solution.

In using a certain amount of ore pulp, say one-fourth (1/4) assay ton, for each ounce of silver represented in a ton of ore it will require one drop or about one-twentieth (1/20) of a cubic centimeter of standard iodin solution to cause the silver nitrate solution to take on a blue color. Different waters have different effects on results, and therefore, in order to obtain exact results as to amount of iodin solution, I dissolve a weighed amount of C. P. silver in acid and titrate with the iodin solution, noting the amount of solution required to bring about the blue color.

I have also found from experience that when starch is added to the silver nitrate solution, a small amount of sodium hyposulfite added to the solution will cause the same to quickly clarify. I would have it understood, however, that not enough sodium hyposulfite is used to cause the solution to become alkaline.

The specific process of assaying for silver constitutes the subject matter of my contemporary application of even date herewith, Serial Number 491,314.

Having described my invention, what I claim and desire to secure by Letters-Patent is:

1. A composition of matter for the purpose described, comprising camphor, iodin and potassium iodid.

2. A composition of matter for the purpose described, comprising gum camphor 1 part, iodin crystals 20.736 parts, potassium iodid 41.471 parts, and water 310. parts.

In testimony whereof I have hereunto set my hand in presence of two subscribing witnesses.

JOSEPH C. HAMES.

Witnesses:
C. O. FOLTZ,
LILLIE B. ANDREWS.